(12) United States Patent
Ting et al.

(10) Patent No.: US 12,442,707 B2
(45) Date of Patent: Oct. 14, 2025

(54) DETECTION SYSTEM AND TRANSIENT PRESSURE RESPONSE DETECTION METHOD FOR DETECTING RESIDUAL AIR BUBBLES IN LIQUID-COOLING SYSTEM AND FLOW RATE CONTROL DEVICE FOR USING THE SAME

(71) Applicant: WISTRON CORP., New Taipei (TW)

(72) Inventors: Tzu-Han Ting, New Taipei (TW); Ming-Chang Wu, New Taipei (TW); Wei-Chung Hsiao, New Taipei (TW)

(73) Assignee: WISTRON CORP., New Taipei (TW)

( * ) Notice: Subject to any disclaimer, the term of this patent is extended or adjusted under 35 U.S.C. 154(b) by 544 days.

(21) Appl. No.: 17/823,525

(22) Filed: Aug. 31, 2022

(65) Prior Publication Data

US 2023/0280228 A1 Sep. 7, 2023

(30) Foreign Application Priority Data

Mar. 1, 2022 (TW) ................................ 111107315

(51) Int. Cl.
| | |
|---|---|
| *G01L 23/26* | (2006.01) |
| *G01L 19/00* | (2006.01) |
| *G05D 7/06* | (2006.01) |
| *H05K 7/20* | (2006.01) |

(52) U.S. Cl.
CPC .......... *G01L 23/26* (2013.01); *G01L 19/0007* (2013.01); *G05D 7/0635* (2013.01); *H05K 7/20254* (2013.01); *H05K 7/20272* (2013.01); *H05K 7/20763* (2013.01); *H05K 7/20836* (2013.01)

(58) Field of Classification Search
CPC .......... H05K 7/20781; H05K 7/20254; H05K 7/20272; H05K 7/20763; H05K 7/20836; G05D 7/0617; G05D 7/00; G05D 7/0635; G01L 23/26; G01L 19/0007; G01L 19/14; G06F 2200/201; G06F 1/206; G06F 1/20; G01M 99/007
See application file for complete search history.

(56) References Cited

U.S. PATENT DOCUMENTS

| | | | |
|---|---|---|---|
| 4,926,675 A | 5/1990 | Schohl et al. | |
| 2007/0112279 A1* | 5/2007 | Iseberg | A61B 5/126 |
| | | | 600/559 |

(Continued)

FOREIGN PATENT DOCUMENTS

| | | |
|---|---|---|
| JP | 2007047083 A | 2/2007 |
| TW | 200813384 A | 3/2008 |

OTHER PUBLICATIONS

EP Office Action dated Jul. 19, 2023 in European application No. 22207557.4-1224.

*Primary Examiner* — Kamini S Shah
*Assistant Examiner* — Zachary Andrew Cain
(74) *Attorney, Agent, or Firm* — McClure, Qualey & Rodack, LLP

(57) ABSTRACT

A detection system adapted for a liquid-cooling system includes a pressurizing device and at least one pressure sensor, the pressurizing device is configured to connect to and to pressure the liquid-cooling system, the pressure sensor is configured to measure a transient pressure response in response to detecting residual air bubbles in the liquid-cooling system.

20 Claims, 5 Drawing Sheets

(56) References Cited

U.S. PATENT DOCUMENTS

2010/0327012 A1\* 12/2010 Saegusa ............. G01N 35/1016
                                                           73/863
2012/0090808 A1   4/2012 Scofield
2022/0104402 A1\* 3/2022 Gao ................... H05K 7/20836
2022/0357302 A1\* 11/2022 Cronin .................... G01M 7/00

\* cited by examiner

DETECTION SYSTEM AND TRANSIENT PRESSURE RESPONSE DETECTION METHOD FOR DETECTING RESIDUAL AIR BUBBLES IN LIQUID-COOLING SYSTEM AND FLOW RATE CONTROL DEVICE FOR USING THE SAME

CROSS-REFERENCE TO RELATED APPLICATIONS

This non-provisional application claims priority under 35 U.S.C. § 119(a) on Patent Application No(s). 111107315 filed in Taiwan (R.O.C.) on Mar. 1, 2022, the entire contents of which are hereby incorporated by reference.

TECHNICAL FIELD

The disclosure relates to a detection system, more particularly to a detection system and a transient pressure response detection method for detecting residual air bubbles in liquid-cooling system and a flow rate control device for using the same.

BACKGROUND

With the advancement and popularization of science and technology and the advent of the era of Internet of Things (IoT), electronic devices, such as notebook computers, desktop computers, and servers, have become an indispensable part of daily life. In order to prevent the heat generated by internal electronic components from affecting the performance and service life, liquid-cooling, which is more effective in heat dissipation than air cooling, has gradually been paid more and more attention.

In general, a liquid-cooling system uses coolant as a medium for heat dissipation and is cooperated with a pump to form a cooling circulation to continuously absorb and take away the heat generated by the heat sources. In some applications, there may be multiple heat sources in the system that need to be cooled, thus a cooling distribution unit (CDU) is widely used to efficiently and controllably distribute the coolant to the cold plates arranged at the heat sources. For example, please see FIG. 1, a conventional liquid-cooling system that adopts a typical cooling distribution unit is provided, as shown, a CDU 31 is connected to a server 33 through manifolds 32 and the CDU 31 is connected to an external cooling tower 34 through pipes, in such an arrangement, the CDU 31 is able to control the flow rate and/or pressure of the coolant and pump the coolant to pass through heat sources (not shown) inside the server 33 from one of the manifolds 32 and pump the high-temperature coolant out of the server 33 to the other manifold 32.

It is known that residual air bubbles or air plugs in the passage of a liquid-cooling system will affect the heat dissipation; in particular, some areas of the passage of the liquid-cooling system, such as turns of pipes or fins within cold plates, tend to result in accumulation of residual air bubbles to reduce performance. Thus, removing residual air bubbles from the coolant inside the liquid-cooling system becomes a necessary work before the operation of the liquid-cooling system. However, to avoid unwanted physical or chemical reactions (e.g., corrosion or freezing) due to uncontrollable factors such as vibration or drastic changes in temperature during transportation and to avoid violations of regulations of some countries on the transportation restrictions to liquid substance, the products that adopt CDU or cold plate are filled with low-reactive gas (e.g., nitrogen gas) instead of coolant before shipping in order to keep the passage clean and dry. As a result, uses have to install pipes, add coolant, and remove residual air bubbles by themselves.

Conventionally, the user is needed to spend hours or days on slowly pouring coolant into the CDU to visually observe whether residual air bubbles have been eliminated from exhaust port, but the user is unable to observe the situation inside the cold plate. Thus, the user has to spend longer time on adding coolant to expect that the residual air bubbles can be completely eliminated. This leads to a time-consuming and troublesome works on the determination of the removal of residual air bubbles from the liquid-cooling system. Also, visually observing residual air bubbles with naked eyes cannot effectively allow users to detect whether residual air bubbles appear in the passage or cold plate and thereby making it unable to achieve the required cooling performance of the liquid-cooling system.

SUMMARY

Accordingly, one aspect of the disclosure is to provide a detection system, a transient pressure response detection method, and a flow rate control device, capable of solving the problems raised in the conventional methods.

One embodiment of the disclosure provides a detection system adapted for a liquid-cooling system and including a pressurizing device and at least one pressure sensor, the pressurizing device is configured to connect to and to pressure the liquid-cooling system, the pressure sensor is configured to measure a transient pressure response in response to detecting residual air bubbles in the liquid-cooling system.

One embodiment of the disclosure provides a flow rate control device adapted to have fluid communication with a cold plate of a liquid-cooling system and including a housing and a detection system. The detection system includes a pressurizing device and at least one pressure sensor, the pressurizing device and the at least one pressure sensor are disposed in the housing, the pressurizing device is configured to connect to at least one of an inlet and an outlet of the cold plate, the at least one pressure sensor is configured to measure a transient pressure response in response to detecting residual air bubbles in the liquid-cooling system.

One embodiment of the disclosure provides a transient pressure response detection method adapted for a pressurizing device and at least one pressure sensor being in fluid communication with a liquid-cooling system. The transient pressure response detection method includes: pressurizing the liquid-cooling system by the pressurizing device; and measuring a transient pressure response in the liquid-cooling system by the at least one pressure sensor to detect residual air bubbles in the liquid-cooling system.

According to the detection system, the transient pressure response detection method, and the flow rate control device as discussed in the above embodiments of the disclosure, the detection system is able to pressurize the coolant in the passage of the liquid-cooling system to incur a transient pressure response used to determine whether residual air bubble or air plug exists in the liquid-cooling system.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
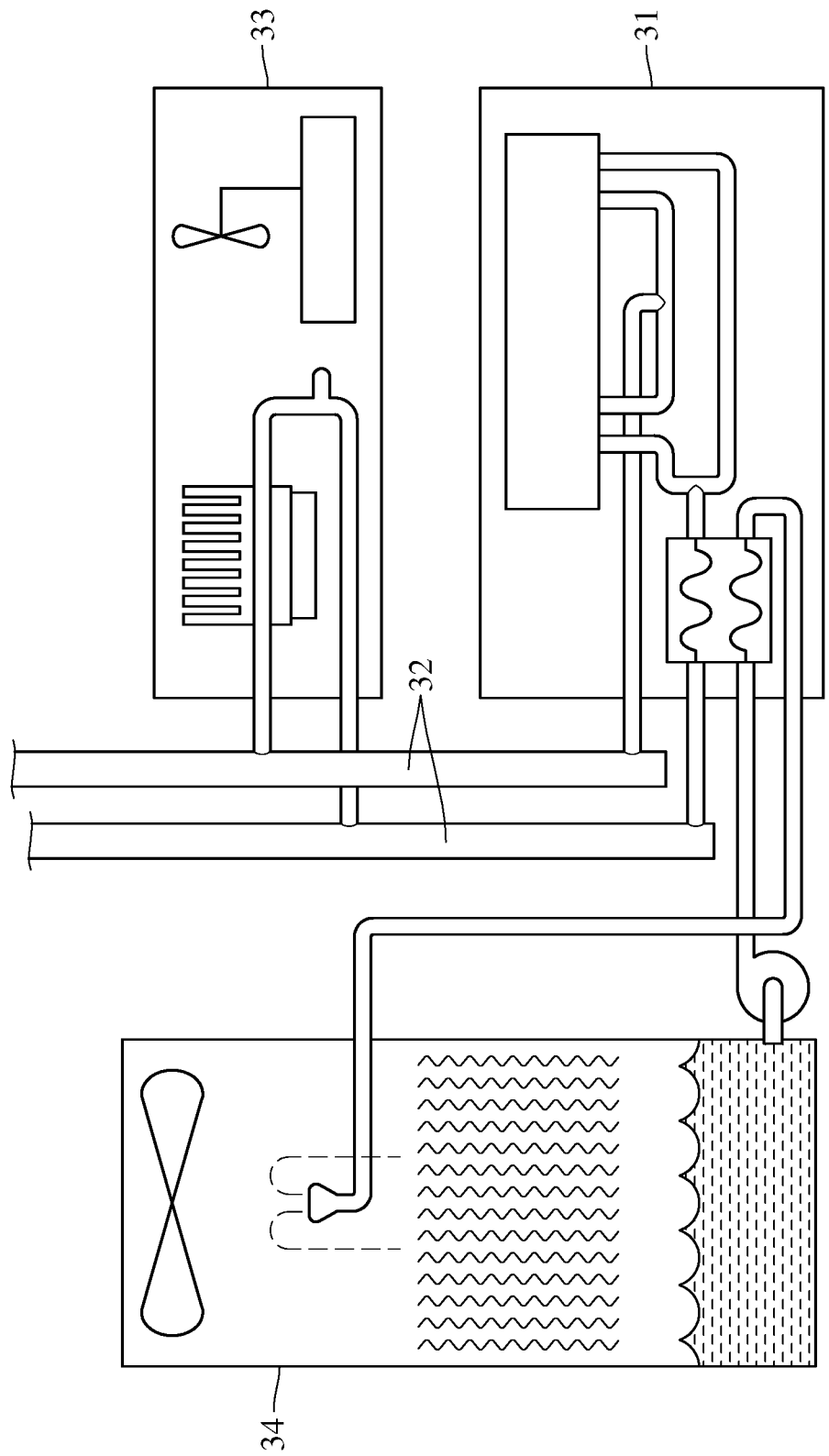
FIG. 1 is a schematic drawing depicting a typical liquid-cooling system for server that adopts a conventional cooling distribution unit.

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "end", "portion", "area" may be used to, but not limiting, describe specific feature or structure. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

In addition, it is known that devices (e.g., servers) that contain more than one heat sources needed to be cooled adopt a liquid-cooling system involving one or more cooling distribution units (CDU); in specific, a typical CDU has a pump used to transfer coolant to cold plates at the heat sources through pipes, such that the heat generated by the heat sources can be absorbed by the cold plates and taken away by the coolant passing through the cold plates. The coolant can be cooled at other places and then flow back to join the next circulation by the pump of the cooling distribution unit, thereby continuously cooling the heat sources. Ideally, the path of the coolant (including the pipes and the cold plate) within the liquid-cooling system shall be filled with coolant and absent of air bubbles, if residual air bubbles exist, the cooling performance of the coolant will be affected. Thus, detecting whether residual air bubbles exist in the path of the coolant within the liquid-cooling system becomes a necessary step before the operation of the cooling circulation.

To this end, a detection system and a transient pressure response detection method according to embodiments of the disclosure are described in detail with reference to FIGS. 2-5. To better understand the following detail descriptions, the terms "pathway", "passage", "pipe", and "tube" and phrase "in fluid communication with" may be used hereinafter; in specific, the terms "pathway", "passage", "pipe", and "tube" may be referred to an assembly of one or more components that transfer coolant to enable coolant to form a circulation over the liquid-cooling system or are able to be in fluid communication with the circulation within the liquid-cooling system, and the phrase "in fluid communication with" means a situation that fluid (liquid and/or gas) is allowed to directly or indirectly flow from one component to another.

Figure 2:
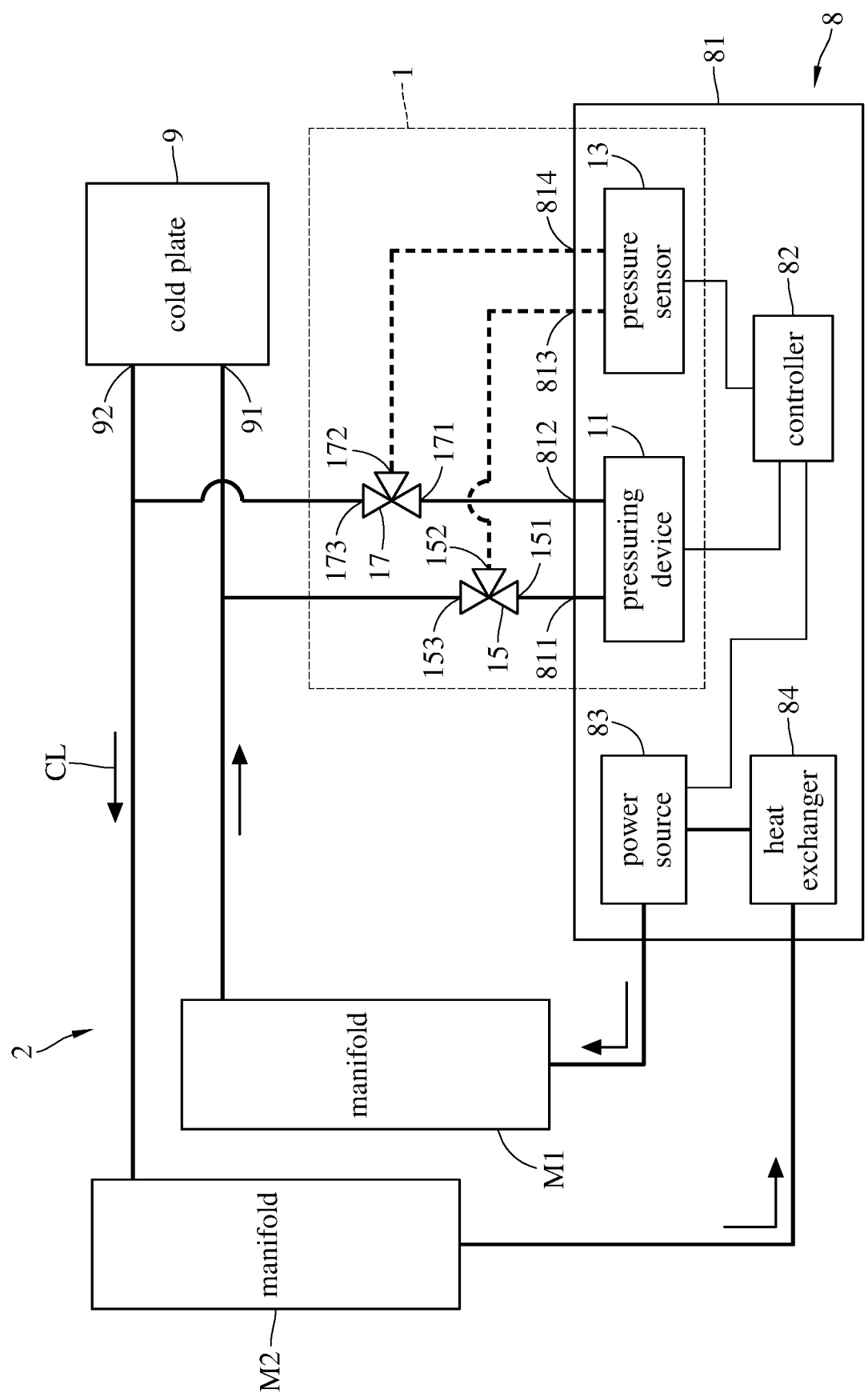
FIG. 2 is a schematic drawing depicting a liquid-cooling system adopting a detection system according to one embodiment of the disclosure.

Please refer to FIG. 2, one embodiment of the disclosure provides a detection system 1 and a liquid-cooling system 2 adopts the detection system 1. For the purpose of simplicity, the pipes in FIG. 1 are not numbered, and the pipes are merely provided for illustrating the relationships among other components but not intended to limit the disclosure.

The liquid-cooling system 2 is applicable to devices (e.g., servers) that contain at least one heat source needed to be cooled. As shown, the liquid-cooling system 2 may include at least one flow rate control device 8, at least one cold plate 9, at least one manifold M1, and at least one manifold M2 which are in fluid communication with one another and therefore can form a cooling circulation CL (as indicated by arrows).

The flow rate control device 8 may be served as a cooling distribution unit (CDU) or part thereof. The flow rate control device 8 is configured to transfer and distribute coolant (not shown) flowing through the liquid-cooling system 2 so as to ensures adequate circulation of coolant to different heat sources in the liquid-cooling system 2. Optionally, the flow rate control device 8 is able to control flow rate and/or pressure of coolant. The cold plate 9 is configured to have direct or indirect thermal contact with one or more heat sources, thus the heat generated by the heat source can be absorbed by the cold plate 9 and taken away by the coolant passing through the cold plate 9. The manifolds M1 and M2 may be any typical manifold and configured to connect to the flow rate control device 8 and an inlet 91 and an outlet 92 of the cold plate 9 via one or more pipes.

Figure 3:
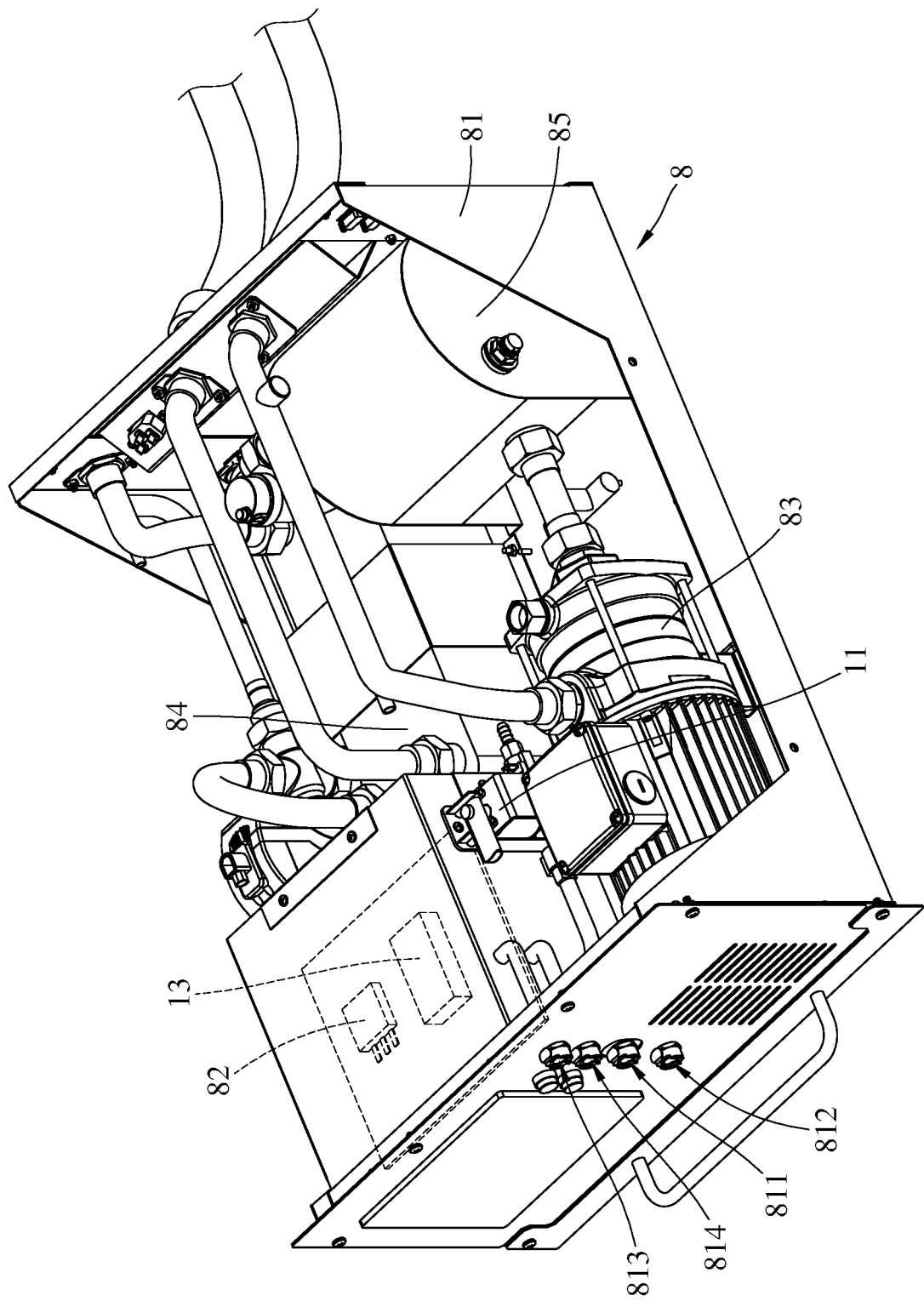
FIG. 3 is a perspective view of an exemplary flow rate control device in FIG. 2.

Then, please further refer to FIG. 3, a perspective view of an exemplary flow rate control device in FIG. 2 is provided. As shown, the flow rate control device 8 may include a housing 81, a controller 82, a power source 83, a heat exchanger 84, and a reservoir 85. The housing 81 is configured to accommodate the controller 82, the power source 83, the heat exchanger 84, and the reservoir 85. The controller 82 may be any suitable processor. The power source 83 may be any suitable pump that can be used to pump coolant to form the cooling circulation CL inside the liquid-cooling system 2. The heat exchanger 84 may act as a radiator to transfer heat from the coolant through its passages so that the coolant can continue traveling through the liquid-cooling system 2.

The reservoir 85 is configured to store a certain amount of coolant to provide or replenish coolant needed by the cooling circulation CL.

Referring to FIGS. 2 and 3, the power source 83 is in fluid communication with the manifold M1 through one or more pipes, the manifold M1 is in fluid communication with the inlet 91 of the cold plate 9 through one or more pipes, the outlet 92 of the cold plate 9 is in fluid communication with the manifold M2 through one or more pipes, the manifold M2 is in fluid communication with the heat exchanger 84 through one or more pipes, and the heat exchanger 84 is in fluid communication with the power source 83 through one or more pipes. In such an arrangement, the power source 83 can pump coolant to the cold plate 9 via the pipes and the manifold M1, and the heat generated by the heat source will be taken away by the coolant passing through the cold plate 9, and then the heated coolant is pumped back to the heat exchanger 84 via the pipes and the manifold M2, the heat exchanger 84 cools the coolant, and then the cooled coolant flows back to the power source 83 to continue circulating as indicated by the cooling circulation CL. In other words, the cooling circulation CL is at least formed by the cold plate 9, the manifolds M1 and M2, the power source 83, the heat exchanger 84, and the pipes thereamong. The reservoir 85 is selectively in fluid communication with the power source 83 to provide or replenish coolant to the cooling circulation CL.

The detection system 1 is provided to detect whether residual air bubbles existing in the cooling circulation CL of the liquid-cooling system 2. In one embodiment, the detection system 1 may include a pressurizing device 11 and at least one pressure sensor 13.

The pressurizing device 11 is configured to pressurize the coolant inside the cooling circulation CL of the liquid-cooling system 2. In one embodiment, the pressurizing device 11 may be any suitable pump. The pressurizing device 11 may be electrically connected to the controller 82 of the flow rate control device 8 or another external controller via a Serial Peripheral Interface (SPI) or an Inter-Integrated Circuit (I2C) bus. The pressurizing device 11 is selectively in fluid communication with the cooling circulation CL but does not participate the cooling circulation CL; in other words, the pressurizing device 11 is not part of the cooling circulation CL and is considered locating outside the cooling circulation CL. Thus, the pressurizing device 11 is externally connected to the liquid-cooling system 2. For example, the pressurizing device 11 may be in fluid communication with the pipes between the inlet 91 and outlet 92 of the cold plate 9 and the manifolds M1 and M2.

The pressure sensor 13 is configured to measure the pressure or pressure variation of the coolant inside the cooling circulation CL of the liquid-cooling system 2. The pressure sensor 13 may be electrically connected to the controller 82 of the flow rate control device 8 or another external controller via a Serial Peripheral Interface (SPI) or an Inter-Integrated Circuit (I2C) bus, thus the pressure sensor 13 is able to transmit signal related to the detected pressure to the controller 82. The pressure sensor 13 may be in fluid communication with the cooling circulation CL but does not participate the cooling circulation CL; in other words, the pressure sensor 13 is not part of the cooling circulation CL and is considered locating outside the cooling circulation CL. For example, the pressure sensor 13 may be in fluid communication with the pipes between the cold plate 9, the manifolds M1 and M2, and the pressurizing device 11.

In this embodiment, the pressurizing device 11 and the pressure sensor 13 may be accommodated within the housing 81 of the flow rate control device 8, in other words, the pressurizing device 11 and the pressure sensor 13 may be integrated into the flow rate control device 8. In other embodiments, the pressurizing device 11 and the pressure sensor 13 may be integrated into another module located outside the flow rate control device 8. For example, in one embodiment, the pressurizing device 11 and the pressure sensor 13 can be placed within a housing with a required electromagnetic shielding to prevent electromagnetic interference from affecting the measurement or detection.

Alternatively, in another embodiment, the pressurizing device 11 and the pressure sensor 13 may be respectively arranged in separated modules or assemblies.

In this embodiment, the detection system 1 may include at least one multiport valve (e.g., a multiport valve 15 and a multiport valve 17). The multiport valve 15 may be any suitable mechanical or electrically driven valve having multiple ports. As shown, the multiport valve 15 may at least include a first port 151, a second port 152, and a third port 153. The first port 151 may be selectively in fluid communication with the pressurizing device 11. For example, the first port 151 may be selectively in fluid communication with the pressurizing device 11 via at least one pipe and a connector 811 of the housing 81. The second port 152 may be selectively in fluid communication with the pressure sensor 13.

For example, the second port 152 may be selectively in fluid communication with the pressure sensor 13 via at least one pipe and a connector 813 of the housing 81. The third port 153 may be selectively in fluid communication with the cooling circulation CL. For example, the third port 153 may be selectively in fluid communication with the pipe connected between the inlet 91 of the cold plate 9 and the manifold M1 via at least one pipe.

In such an arrangement, the pressurizing device 11 is in indirect fluid communication with the pressure sensor 13 through the pipes and the multiport valve 15.

The multiport valve 17 may be any suitable mechanical or electrically driven valve having multiple ports. As shown, the multiport valve 17 may at least include a first port 171, a second port 172, and a third port 173. The first port 171 may be selectively in fluid communication with the pressurizing device 11. For example, the first port 171 may be selectively in fluid communication with the pressurizing device 11 via at least one pipe and a connector 812 of the housing 81. The second port 172 may be selectively in fluid communication with the pressure sensor 13. For example, the second port 172 may be selectively in fluid communication with the pressure sensor 13 via at least one pipe and a connector 814 of the housing 81. The third port 173 may be selectively in fluid communication with the cooling circulation CL. For example, the third port 173 may be selectively in fluid communication with the pipe connected between the outlet 92 of the cold plate 9 and the manifold M2. In such an arrangement, the pressurizing device 11 is in indirect fluid communication with the pressure sensor 13 through the pipes and the multiport valve 17.

Accordingly, the pressurizing device 11 is able to selectively pressurize the coolant inside the cooling circulation CL of the liquid-cooling system 2, and the pressure sensor 13 is able to selectively detect the pressure variation or pulse caused by the pressurization that the pressurizing device 11 acts on the cooling circulation CL. For example, in this embodiment, the pressurizing device 11 is able to pressurize the coolant near the inlet 91 or the outlet 92 of the cold plate 9 so as to increase the pressure difference between the inlet 91 and the outlet 92 of the cold plate 9, and the pressure sensor 13 can detect such sudden difference in pressure and thereby output a result facilitating to determine whether residual air bubbles existing in the cooling circulation CL (e.g., the cold plate 9).

The particles in gas are much farther away from each other allowing them for easier movement and more compressibility while the particles in liquid are closer together making them a lost less compressible. Thus, when a certain amount of sudden pressure is applied to a liquid-cooling circulation with residual air bubbles or air plugs therein, pressure waves transmitting through the liquid substance will be partially reflected by the residual air bubbles and thereby causing the pressure wave to oscillate back and forth in liquid. On the other hand, when the same sudden pressure is applied to a liquid-cooling circulation without residual air bubbles or air plugs, the pressure wave in liquid will not be oscillated.

Figure 4:
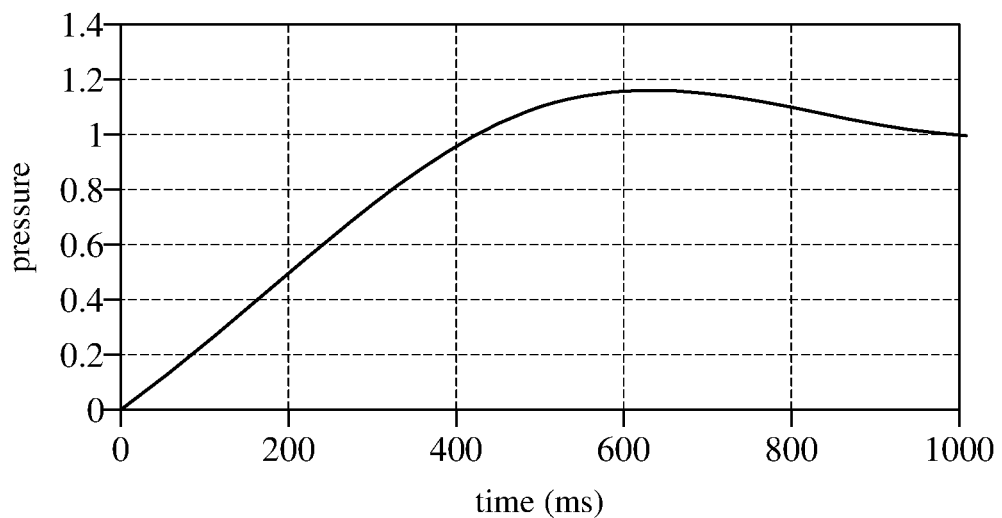
FIG. 4 is a graph showing a pressure variation of the liquid-cooling system when the liquid-cooling system contains residual air bubbles.
Figure 5:
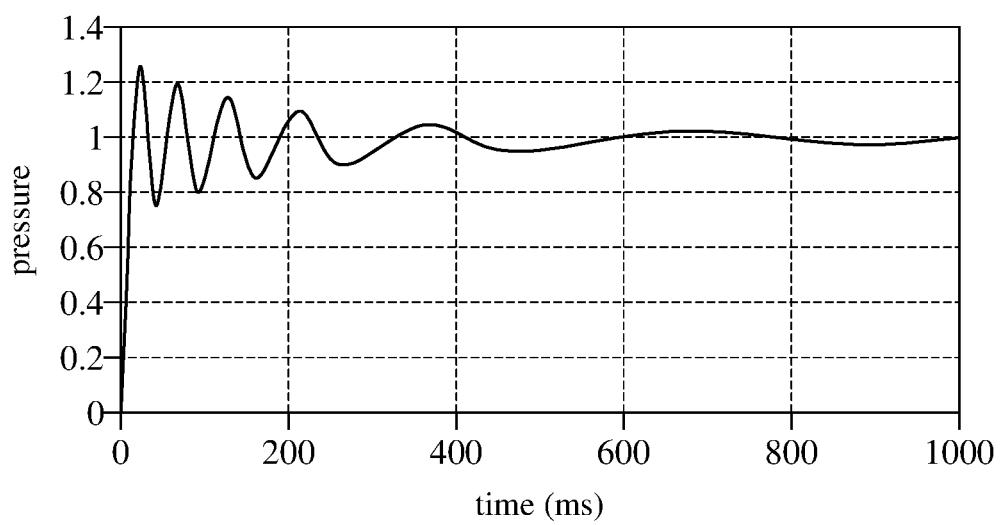
FIG. 5 is a graph showing a pressure variation of the liquid-cooling system when residual air bubbles exist in the liquid-cooling system.

Please see FIGS. 4-5 to better understand the above findings behind the transmission of pressure wave through liquid-cooling system, where FIG. 4 is a graph showing a pressure variation of the coolant in the liquid-cooling system 2 when the detection system 1 pressurizes the liquid-cooling system 2 and there is no residual air bubbles existing in the liquid-cooling system 2, and FIG. 5 is a graph showing a pressure variation of the coolant in the liquid-cooling system 2 when the detection system 1 pressurizes the liquid-cooling system 2 and there are residual air bubbles existing in the liquid-cooling system 2. As can be seen, the pressure variation in FIG. 4 is mild when responding to the pressure by the detection system 1, but the pressure variation in FIG. 5 appears a short period of significant oscillations when responding to the same pressure. This transient pressure response (i.e., the oscillations) shown in FIG. 5 is caused by residual air bubbles repeatedly reflecting the pressure wave in the liquid. Accordingly, to observe or detect whether a transient pressure response or similar pressure variation occur after additionally pressurizing the coolant inside the liquid-cooling system can be an approach to determine whether residual air bubbles or air plugs existing in the liquid-cooling system. Based on that, the detection system 1 employs the pressurizing device 11 to pressurize the passage of the liquid-cooling system 2 and employs the pressure sensor 13 to measure the pressure variation responsive to the pressurization and thereby the detection system 1 will be able to detect whether residual air bubbles or air plugs existing in the liquid-cooling system 2.

An suitable algorithm for determining the pressure signal sent from the pressure sensor 13 may be pre-stored in the controller (e.g., the controller 82) cooperated with the detection system 1; in specific, the system pre-stored in the controller may contain standard pressure variations responsive to different pressures (e.g., the graph in FIG. 4), transient pressure variations responsive to different pressures (e.g., the transient pressure response in FIG. 5), and an algorithm for comparing the transient pressure variations to the standard pressure variations.

The aforementioned pressure oscillation caused by residual air bubbles generally is transmitted at a speed of about 10 m/s- 100 m/s or higher. Thus, when the traveling distance available for the pressure oscillation is short (e.g., the passage between the cold plate 9 and the detection system 1 may be less than one or few meters), the transient pressure response caused by the oscillation may appear merely within a short period of time (e.g., 10 to 100 milliseconds). The pressure sensor 13 may have a response time fast enough to capture such transient pressure response. In one embodiment, the pressure sensor 13 of the detection system 1 may have a response time at least shorter than 10 milliseconds. For example, the pressure sensor 13 may have a response time ranging between 1 and 10 milliseconds. Correspondingly, the controller (e.g., the controller 82) cooperated with the detection system 1 may be able to perform at a speed responsive to the pressure signal sent from the pressure sensor 13.

The pressurizing device 11 of the detection system 1 not only can pressurize the coolant but also can work as an amplifier to increase the amplitude of the pressure oscillation, making it easier for the pressure sensor 13 to effectively detect the transient pressure response happening in a short period of time. Optionally, the controller (e.g., the controller 82) cooperated with the detection system 1 may be able to filter noise out of the transient pressure variation using time-series averaging or any suitable method to generate an accurate result.

Figure 6:
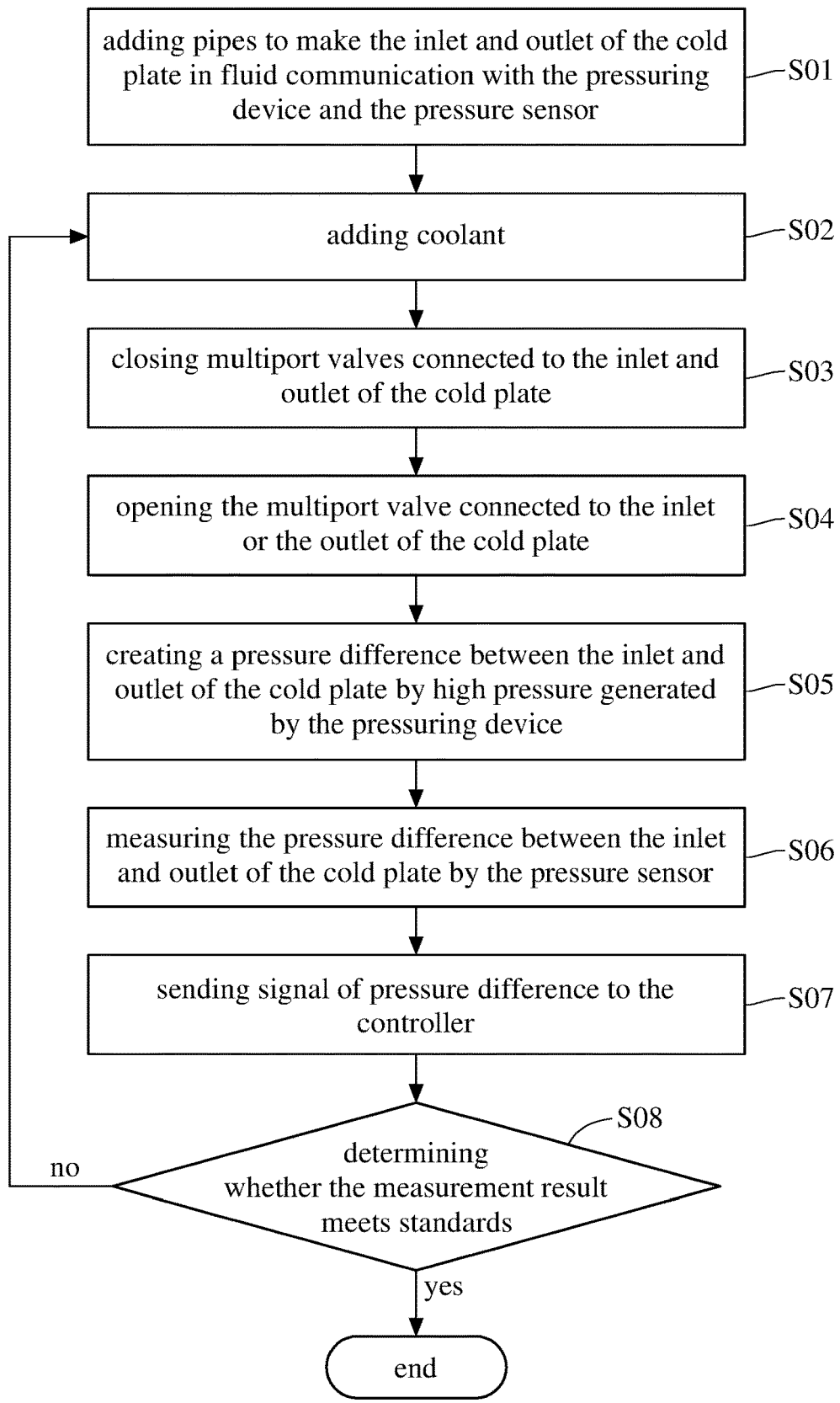
FIG. 6 is a flowchart of a transient pressure response detection method according to one embodiment of the disclosure.

Then, please see FIG. 2 and further see FIG. 6, the transient pressure response detection method that adopts the detection system 1 to detect the liquid-cooling system 2 is described in detail hereinafter. As shown, the transient pressure response detection method of one embodiment may include the following steps: a step S01 related to connecting a cold plate to the pressurizing device and the pressure sensor, steps S02-S03 related to adding coolant, a step S04 related to opening one of valves to make the pressurizing device in fluid communication with the cold plate, a step S05 related to pressurizing the coolant, a step S06 related to measuring pressure of the coolant, and steps S07-08 related to sending signal and determining whether the measurement result meets standards.

In detail, in step S01, pipes are provided to make the inlet 91 and outlet 92 of the cold plate 9 in fluid communication with the pressurizing device 11 and the pressure sensor 13. Thus, the pressurizing device 11 and the pressure sensor 13 may both be in fluid communication with the inlet 91 and outlet 92 of the cold plate 9 and the manifolds M1 and M2 via the pipes. More specifically, as discussed above, the pressurizing device 11 may be in fluid communication with the inlet 91 and outlet 92 of the cold plate 9 and the pressure sensor 13 through the pipes, the multiport valve 15, and the multiport valve 17; in other words, the pressure sensor 13 may be in fluid communication with the inlet 91 and outlet 92 of the cold plate 9 and the pressurizing device 11 through the pipes, the multiport valve 15, and the multiport valve 17.

In step S02, a suitable coolant is added into the passage of the liquid-cooling system 2, thus the coolant exists in the pipes and the cold plate 9. Note that the adding of the coolant is not intended to limit the disclosure and may be omitted if the coolant was pre-filled in the liquid-cooling system 2.

Then or meanwhile, in step S03, the multiport valve 15 and the multiport valve 17 connected to the pressurizing device 11, the pressure sensor 13, and the inlet 91 and outlet 92 of the cold plate 9 are closed to facilitate the coolant to be added into the cold plate 9.

Then, in step S04, the multiport valve 15 connected to the inlet 91 or the multiport valve 17 connected to the outlet 92 is opened. Specifically, when the first port 151 and the third port 153 of the multiport valve 15 connected between the pressurizing device 11 and the inlet 91 of the cold plate 9 or the first port 171 and the third port 173 of the multiport valve 17 connected between the pressurizing device 11 and the outlet 92 of the cold plate 9 are opened, the pressurizing device 11 can be in fluid communication with the cold plate 9.

Then or meanwhile, in step S05, the pressurizing device 11 pressurizes the passage of the liquid-cooling system 2. Specifically, the controller (e.g., the controller 82) cooperated with the detection system 1 can instruct the pressurizing device 11 to apply a specific high pressure to the passage of the liquid-cooling system 2. Since the pressurizing device 11 is in fluid communication with the inlet 91 or outlet 92 of the cold plate 9, the pressurizing device 11 at this stage can pressurize at least one of the pipes connected to the inlet 91 and outlet 92 of the cold plate 9 so as to generate a short period time of pressure increase near the inlet 91 or outlet 92 of the cold plate 9. This causes an additional pressure difference appearing between the inlet 91 and outlet 92 of the cold plate 9. Note that the actual pressure provided by the pressurizing device 11 is not limiting as long as it is high enough for the pressure sensor 13 to be able to detect an effective transient pressure response.

Then or meanwhile, in step S06, the pressure sensor 13 measures the gauge pressure or pressure variation of the coolant inside the liquid-cooling system 2 caused by the pressurizing device 11. Specifically, the second port 152 of the multiport valve 15 or the second port 172 of the multiport valve 17 may be opened during the step S04, such that the pressure sensor 13 can be in fluid communication with the passage or pipes pressurized by the pressurizing device 11, thereby the pressure sensor 13 can measure the gauge pressure or pressure variation of the coolant near the inlet 91 and/or outlet 92 of the cold plate 9.

Then or meanwhile, in step S07, the pressure sensor 13 outputs pressure signal according to the pressure or pressure variation and sends it to the controller (e.g., the controller 82) cooperated with the detection system 1 in a wireless or wired manner. As discussed above, when there are no residual air bubbles or air plugs existing in the cold plate 9, the graph reflecting the pressure signal responsive to the pressure variation measured by the pressure sensor 13 will be similar to a standard pressure variation as depicted in FIG. 4; however, when there are residual air bubbles or air plugs existing in the cold plate 9, the graph reflecting the pressure signal responsive to the pressure variation measured by the pressure sensor 13 will appear a transient pressure response as depicted in FIG. 5.

Then or meanwhile, step S08 is performed to determine whether the measurement result meets standards. Specifically, an algorithm or database for determining the relationships between the pressure variation and existence of residual air bubbles under various circumstances may be pre-stored in the controller (e.g., the controller 82) cooperated with the detection system 1. For example, the standard pressure variation in FIG. 4 may be used as a standard to be compared with the pressure or pressure variation measured by the pressure sensor 13. As such, comparing the stored standard pressure variation with the measure result obtained by the pressure sensor 13 is able to determine whether residual air bubbles exist in the passage of the liquid-cooling system 2.

When the graph reflected by the obtained pressure signal responsive to the pressure variation is similar to or the same as the stored standard pressure variation, the passage (e.g., the cold plate 9) of the liquid-cooling system 2 is determined to have no residual air bubble or air plug therein. On the contrary, when the graph reflected by the obtained pressure signal responsive to the pressure variation appears a transient pressure response similar to that as shown in FIG. 5, the passage (e.g., the cold plate 9) of the liquid-cooling system 2 is determined to have residual air bubbles, and then the user can do required action, such as performing step S02 again to keep adding coolant to force out the remaining residual air bubbles.

By operating the multiport valve 15 and the multiport valve 17, the pressure sensor 13 is allowed to measure the pressures or pressure differences of both the inlet 91 and outlet 92 of the cold plate 9 at the same time. Thus, the controller (e.g., the controller 82) can obtain two graphs reflected by the pressure variations occurring near the inlet 91 and the outlet 92 and therefore are beneficial to improve the accuracy of detection. The number of points that the pressure sensor measures the liquid-cooling system is not limiting, and the number of the valves used in the detection system can be modified as required. In one embodiment, there may be only one valve connected between the pressurizing device, the pressure sensor, and the cold plate.

Optionally, the pipes between the multiport valves and the pressure sensor may have an inside diameter smaller than 1 millimeter to facilitate the pressure sensor to accurately and precisely measure the pressure or the pressure difference near or at the cold plate. Note that the detection system and the transient pressure response detection method may be applied to other areas of the passage of the liquid-cooling system but not limited to be near the inlet and outlet of the cold plate.

According to the detection system, transient pressure response detection method, and the flow rate control device as discussed in the above embodiments of the disclosure, the detection system is able to pressurize the coolant in the passage of the liquid-cooling system to incur a transient pressure response used to determine whether residual air bubble or air plug exists in the liquid-cooling system. This allows the user to efficiently and effectively determine the existence of air bubble during the installation, operation, and maintenance of the liquid-cooling system to prevent the problems that the conventional approach needs to take couple days to verify the existence of air bubbles, thereby ensuring that the cooling circulation performs at a predetermined speed or facilitating to determine whether the system needs maintenance or piece replacement.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A detection system, adapted for a liquid-cooling system, comprising:
   a pressurizing device connecting to and pressuring the liquid-cooling system; and
   at least one pressure sensor measuring a transient pressure response in response to detecting residual air bubbles in the liquid-cooling system, wherein the pressurizing device and the at least one pressure sensor are disposed in parallel to the liquid-cooling system.

2. The detection system according to claim 1, wherein the transient pressure response is generated by interaction of gas and liquid within the liquid-cooling system.

3. The detection system according to claim 1, wherein the pressurizing device is configured to connect to a cooling circulation of the liquid-cooling system.

4. The detection system according to claim 1, wherein the at least one pressure sensor is configured to connect to a cooling circulation of the liquid-cooling system.

5. The detection system according to claim 1, further comprising at least one multiport valve comprising a first port, a second port, and a third port, wherein the first port is in fluid communication with the pressurizing device, the second port is in fluid communication with the at least one pressure sensor, and the third port is configured to have fluid communication with the liquid-cooling system.

6. The detection system according to claim 5, wherein at least one pipe between the at least one pressure sensor and the at least one multiport valve has an inside diameter smaller than 1 millimeter.

7. The detection system according to claim 1, wherein the at least one pressure sensor has a response time at least shorter than 10 milliseconds.

8. A flow rate control device, adapted to have fluid communication with a cold plate of a liquid-cooling system, comprising:
a housing; and
a detection system, comprising:
a pressurizing device and at least one pressure sensor, wherein the pressurizing device and the at least one pressure sensor are disposed in the housing and are disposed in parallel to the liquid-cooling system, the pressurizing device connects to at least one of an inlet and an outlet of the cold plate, the at least one pressure sensor measures a transient pressure response in response to detecting residual air bubbles in the liquid-cooling system.

9. The flow rate control device according to claim 8, wherein the detection system further comprises at least one multiport valve, the at least one multiport valve comprises a first port, a second port, and a third port, the first port is in fluid communication with the pressurizing device, the second port is in fluid communication with the at least one pressure sensor, and the third port is configured to have fluid communication with at least one of the inlet and the outlet of the cold plate.

10. The flow rate control device according to claim 9, wherein at least one pipe between the at least one pressure sensor and the at least one multiport valve has an inside diameter smaller than 1 millimeter.

11. The flow rate control device according to claim 8, further comprising a power source disposed in the housing and configured to cause a cooling circulation in the liquid-cooling system, wherein the pressurizing device and the power source are pumps.

12. The flow rate control device according to claim 8, wherein the at least one pressure sensor has a response time at least shorter than 10 milliseconds.

13. The flow rate control device according to claim 8, wherein the flow rate control device is a cooling distribution unit.

14. A transient pressure response detection method, adapted for a pressurizing device and at least one pressure sensor being in fluid communication with a liquid-cooling system, comprising:

pressurizing the liquid-cooling system by the pressurizing device; and
measuring a transient pressure response in the liquid-cooling system by the at least one pressure sensor to detect residual air bubbles in the liquid-cooling system, wherein the pressurizing device and the at least one pressure sensor are disposed in parallel to the liquid-cooling system.

15. The transient pressure response detection method according to claim 14,
wherein the step of pressurizing the liquid-cooling system by the pressurizing device comprises:
connecting the pressurizing device to a cooling circulation of the liquid-cooling system.

16. The transient pressure response detection method according to claim 14, wherein the step of measuring the transient pressure response in the liquid-cooling system by the at least one pressure sensor comprises:
connecting the at least one pressure sensor to a cooling circulation of the liquid-cooling system.

17. The transient pressure response detection method according to claim 14, wherein the step of pressurizing the liquid-cooling system by the pressurizing device comprises:
pressurizing at least one of an inlet and an outlet of a cold plate of the liquid-cooling system by the pressurizing device.

18. The transient pressure response detection method according to claim 17, wherein the step of measuring the transient pressure response in the liquid-cooling system by the at least one pressure sensor comprises:
measuring at least one pipe in fluid communication with the inlet and the outlet of the cold plate of the liquid-cooling system by the at least one pressure sensor.

19. The transient pressure response detection method according to claim 14, wherein the step of measuring the transient pressure response in the liquid-cooling system by the at least one pressure sensor comprises:
comparing a transient pressure variation reflected by the transient pressure response detected by the at least one pressure sensor with a standard pressure variation.

20. The transient pressure response detection method according to claim 14, wherein the at least one pressure sensor has a response time at least shorter than 10 milliseconds.

* * * * *